US007825826B2

(12) United States Patent
Welch

(10) Patent No.: US 7,825,826 B2
(45) Date of Patent: Nov. 2, 2010

(54) METHOD, APPARATUS AND SYSTEM FOR PARKING OVERSTAY DETECTION

(75) Inventor: Fraser John Welch, Brighton (AU)

(73) Assignee: Vehicle Monitoring Systems Pty Ltd. (AU)

( * ) Notice: Subject to any disclaimer, the term of this patent is extended or adjusted under 35 U.S.C. 154(b) by 560 days.

(21) Appl. No.: 11/579,895

(22) PCT Filed: May 9, 2005

(86) PCT No.: PCT/AU2005/000660

§ 371 (c)(1),
(2), (4) Date: Jul. 19, 2007

(87) PCT Pub. No.: WO2005/111963

PCT Pub. Date: Nov. 24, 2005

(65) Prior Publication Data

US 2007/0285281 A1 Dec. 13, 2007

(30) Foreign Application Priority Data

May 17, 2004 (AU) .............................. 2004902622

(51) Int. Cl.
*B60Q 1/48* (2006.01)

(52) U.S. Cl. .................................... 340/932.2; 340/933

(58) Field of Classification Search .............. 340/932.2, 340/933, 693.5, 693.9, 693.12; 194/200, 194/217, 218, 219, 318; 368/90; 324/329; 235/384

See application file for complete search history.

(56) References Cited

U.S. PATENT DOCUMENTS 2,652,551 A 9/1953 Gumpertz et al.
4,912,414 A * 3/1990 Lesky et al. ................. 324/329
5,442,348 A * 8/1995 Mushell ................... 340/932.2
5,852,411 A * 12/1998 Jacobs et al. ............. 340/932.2
6,275,170 B1 8/2001 Jacobs et al.

(Continued)

FOREIGN PATENT DOCUMENTS

FR 2634303 A1 * 1/1990

(Continued)

OTHER PUBLICATIONS

Examiner's First Report on Australian Patent Application No. 2005243110, 3 pages, Feb. 16, 2007.

(Continued)

*Primary Examiner*—Van T. Trieu
(74) *Attorney, Agent, or Firm*—Wood, Phillips, Katz, Clark & Mortimer

(57) ABSTRACT

Methods, apparatuses and systems for identifying overstay of a vehicle (624, 644) in a parking space (610, 620, 630, 640, 650, 660) are disclosed herein. The method comprises the steps of detecting presence of a vehicle in a parking space using a detection apparatus (612, 622, 632, 642, 652, 662), processing and storing data relating to presence of the vehicle in the detection apparatus, wirelessly (672, 674) waking-up the detection apparatus, wirelessly retrieving at least a portion of the data from the detection apparatus, and identifying overstay of the vehicle in the parking space based on the retrieved data. Wireless wake-up of a detection apparatus may be irregularly performed by an occasionally present data collection apparatus (680). Apparatuses and systems are disclosed for performing the foregoing method.

27 Claims, 9 Drawing Sheets

U.S. PATENT DOCUMENTS

| | | | | |
|---|---|---|---|---|
| 6,312,152 | B2 * | 11/2001 | Dee et al. | 368/90 |
| 6,335,927 | B1 | 1/2002 | Elliott et al. | |
| 6,559,776 | B2 | 5/2003 | Katz | |
| 6,889,899 | B2 * | 5/2005 | Silberberg | 235/384 |
| 7,002,487 | B1 * | 2/2006 | Montgomery, Sr. | 340/932 |
| 2002/0011768 | A1 | 1/2002 | Boehler et al. | |
| 2002/0019609 | A1 | 2/2002 | McFarlane | |
| 2002/0030606 | A1 | 3/2002 | Chauvin et al. | |
| 2002/0065884 | A1 | 5/2002 | Donoho et al. | |
| 2003/0169183 | A1 * | 9/2003 | Korepanov et al. | 340/932.2 |
| 2003/0179107 | A1 | 9/2003 | Kibria et al. | |

FOREIGN PATENT DOCUMENTS

| | | | |
|---|---|---|---|
| JP | 10-172092 | A | 6/1998 |
| WO | WO 02/63570 | A2 | 2/2002 |
| WO | 02/063570 | A | 8/2002 |

OTHER PUBLICATIONS

Examiner's Report No. 2 on Australian Patent Application No. 2005243110, 2 pages, Jun. 7, 2007.

Examination Report, New Zealand Application No. 552100, May 8, 2008, 2 pages.

Supplementary European Search Report for corresponding European Application No. EP 05 73 7801 dated Nov. 30, 2009.

EPO Communication for corresponding European Application No. EP 05 73 7801 dated Feb. 16, 2010.

* cited by examiner

METHOD, APPARATUS AND SYSTEM FOR PARKING OVERSTAY DETECTION

FIELD OF THE INVENTION

The present invention relates to parking violations and more particularly to detection of vehicles that overstay a defined time interval in parking spaces.

BACKGROUND

Demand for on-street parking spaces in today's modern cities often exceeds supply, which necessitates rationing of the parking resource by implementation of time restrictions. Parking time restrictions typically vary according to the competing needs and demands of a given area. Time restricted public parking spaces may require the payment of a fee or be free of charge. Parking meters or similar devices may be installed to collect fees. In any case, time limits are applied to parking spaces to ensure equitable sharing of access to a limited public resource to promote the interests of the community.

Enforcement of time restrictions in public parking spaces is a central element of any effective parking management program. Effective parking management requires regular and consistent enforcement. However, existing methods for identifying vehicles that have exceeded a parking space's time limit are inefficient. For example, a traditional method of detecting vehicles that have exceeded a parking space's time limit is to manually place a chalk mark on a tyre of each of the vehicles parked in a specific zone and then return at an appropriate time to check if any of the vehicles with "chalked" tyres are still parked. Some of the disadvantages associated with this method are:

- each parking space must be visited at least twice (usually on foot),
- the two visits must be timed to match the time restriction plus any grace period allowed by the enforcement authority,
- parking spaces within the same general area that have different time limits (e.g., 1-hour & 2-hour) must be enforced separately, and
- The system can be defeated simply by either by rubbing off the chalk mark or moving a vehicle to a different parking space after a parking officer has "chalked" tyres of cars in a particular area.

A need thus exists for a method, an apparatus and a system that overcomes or at least ameliorates one or more of the foregoing disadvantages.

SUMMARY

According to an aspect of the present invention, there is provided a method performed by a subterraneous detection apparatus for identifying overstay of a vehicle in a parking space. The method comprises the steps of detecting presence of a vehicle in the parking space, processing and storing data relating to presence of the vehicle in the parking space, determining whether the vehicle has overstayed a defined time duration in the parking space, and wirelessly transmitting data relating to identified instances of overstay of the vehicle in the parking space.

According to another aspect of the present invention, there is provided a battery-powered apparatus for a battery-powered apparatus for subterraneous installation for identifying overstay of a vehicle in a parking space. The apparatus comprises a detector adapted to detect presence of a vehicle in the parking space, a processor coupled to the detector for processing and storing data received from the detector and determining whether the vehicle has overstayed a defined time duration in the parking space, a radio receiver coupled to the processor for receiving wake-up signals, and a radio transmitter coupled to the processor for transmitting data relating to identified instances of overstay of the vehicle in the parking space.

According to another aspect of the present invention, there is provided a system for identifying overstay of vehicles in parking spaces. The system comprises a plurality of battery-powered detection apparatuses for identifying overstay of vehicles in respective parking spaces when subterraneously installed, and a data collection apparatus for wirelessly retrieving data from the plurality of battery-powered detection apparatuses. The data collection apparatus comprises a radio transmitter for transmitting wake-up signals to ones of the plurality of battery-powered detection apparatuses, a radio receiver for receiving data from woken-up ones of the plurality of battery-powered detection apparatuses, a memory unit for storing data and instructions to be performed by a processing unit, and a processing unit coupled to the radio transmitter, the radio receiver and the memory unit. The processing unit is programmed to process the data received via the radio receiver and to indicate incidences of vehicle overstay to an operator. The data relates to identified instances of vehicle overstay in a respective parking space.

Repeated wireless wake-up of a detection apparatus is typically performed irregularly with respect to time depending on the presence of a data collection device. Wireless retrieval of data may be performed in response to wireless wake-up of a detection apparatus. Overstay of a vehicle in a parking space may be determined at the detection apparatus by processing data received from the detector.

The data collection apparatus may be portable and may retrieve the data from the detection apparatus whilst the data collection apparatus is located in a moving vehicle. Data relating to presence of a vehicle may comprise presence duration of the vehicle in the parking space, movements of the vehicle in and out of the parking space with corresponding time-stamp information, and/or an indication of overstay of the vehicle in the parking space. Vehicle presence detection may be performed by a magnetometer that detects changes in the earth's magnetic field caused by presence or absence of a vehicle in the parking space. The detection apparatus may be encased in a self-contained, sealed housing for subterraneous installation in a parking space. The radio transmitter and/or radio receiver may operate in the ultra-high frequency (UHF) band and may jointly be practised as a transceiver.

BRIEF DESCRIPTION OF THE DRAWINGS

A small number of embodiments are described hereinafter, by way of example only, with reference to the accompanying drawings in which.

DETAILED DESCRIPTION

Methods, apparatuses and systems are described herein for identifying overstay of vehicles in parking spaces.

Figure 1:
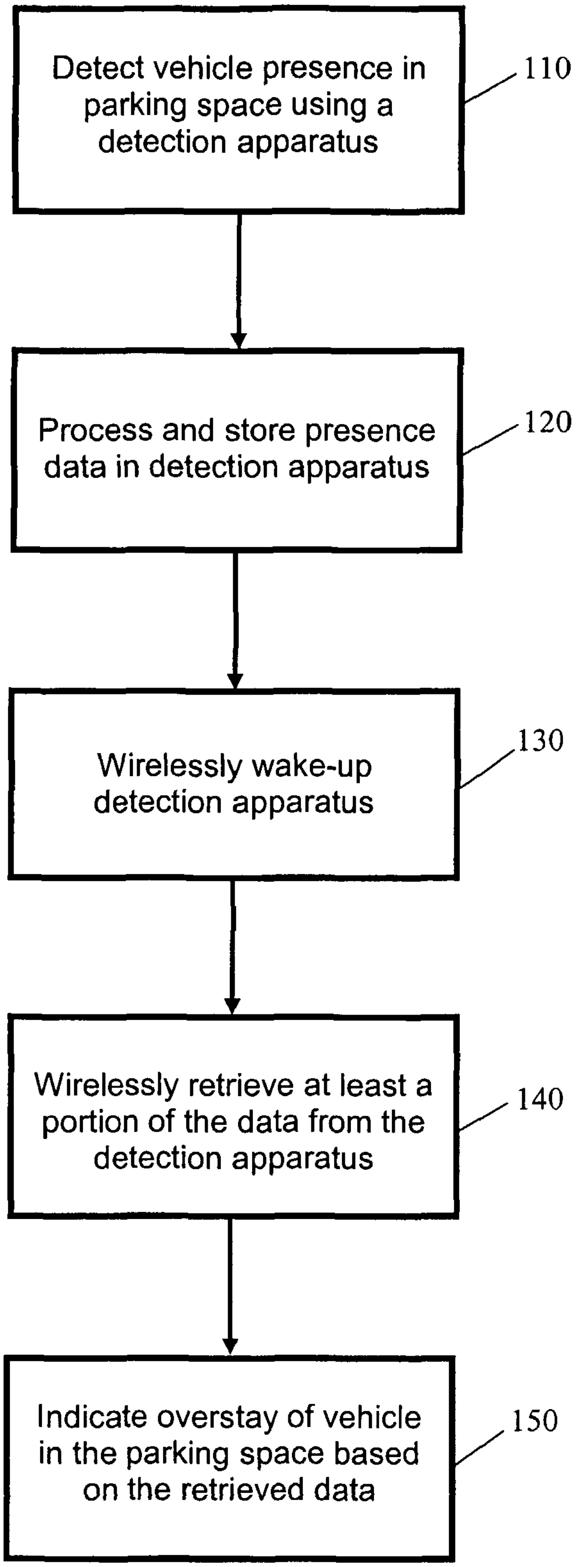
FIG. 1 is a flow diagram of a method for identifying overstay of a vehicle in a parking space.

FIG. 1 is a flow diagram of a method for identifying overstay of a vehicle in a parking space. Presence of a vehicle in the parking space is detected using a detection apparatus in step 110. Data relating to presence of the vehicle is processed and stored in the detection apparatus at step 120. The detection apparatus is wirelessly woken-up at step 130 and at least a portion of the data is retrieved from the detection apparatus at step 140. Overstay of the vehicle in the parking space is indicated based on the retrieved data at step 150.

Figure 2:
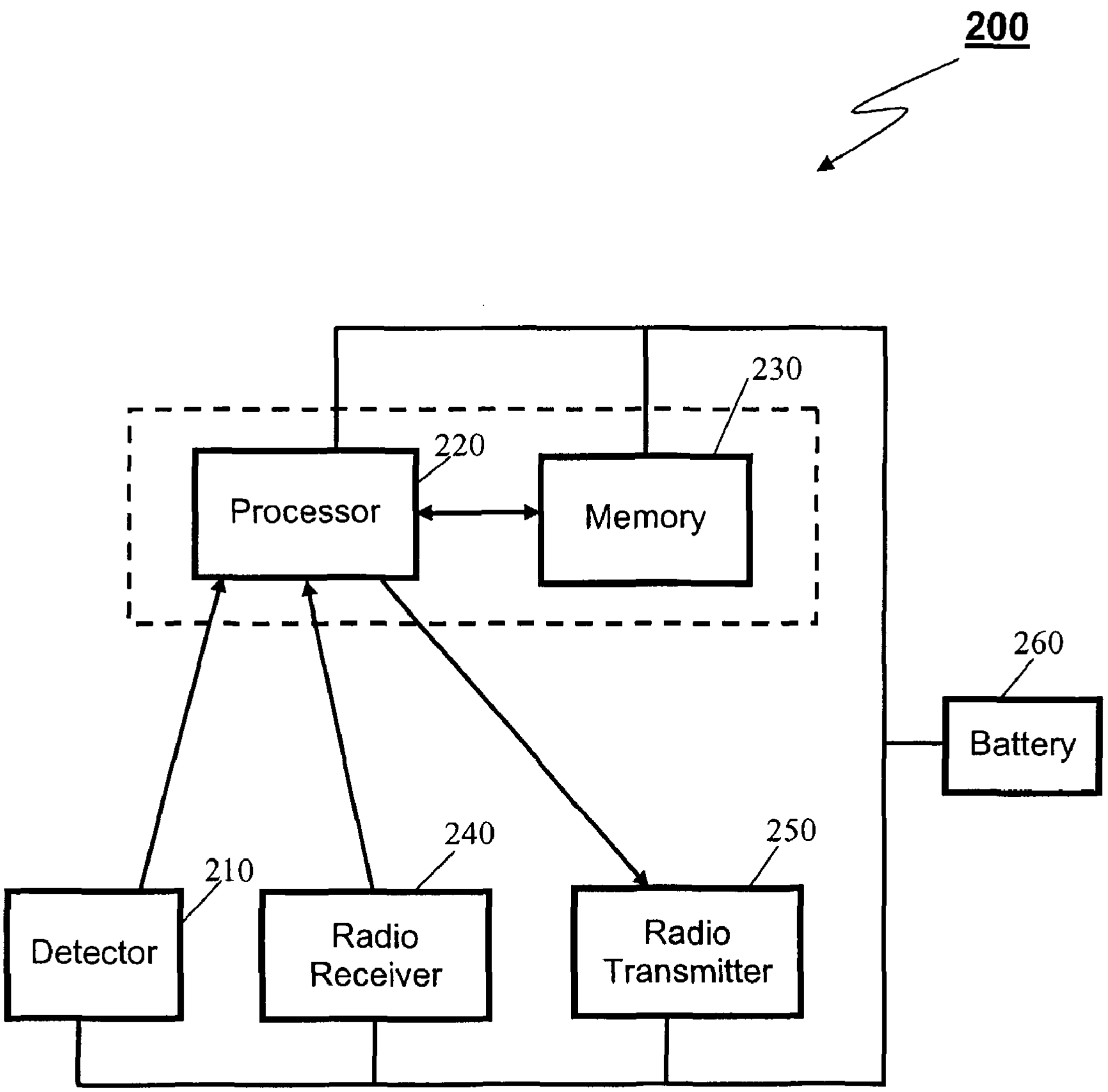
FIG. 2 is a block diagram of a detection apparatus for monitoring presence of a vehicle in a parking space.

FIG. 2 is a block diagram of an apparatus 200 for monitoring presence of a vehicle in a parking space. The apparatus comprises a detector 210 for detecting presence of a vehicle in the parking space, a processor 220 for processing data received from the detector 210, a memory 230 for storing data before and after processing, a radio receiver 240 for receiving a wake-up signal from a data collection apparatus located remotely from the parking space, a radio transmitter 250 for transmitting at least a portion of the data to the data collection apparatus, and a battery 260 for powering each of the detector 210, the processor 220, the memory 230, the radio receiver transmitter 240, and the radio transmitter 250. The processor 220 and the memory 230 may be integrated in a single device such as a microprocessor or microcontroller. The processor 220 is coupled to each of the detector 210, the memory 230, the radio receiver 240, and the radio transmitter 250.

In one particular embodiment, the detector 210 comprises a magnetometer, which detects changes in the earth's magnetic field that result from close proximity to the detector 210 of a vehicle having substantial metal content. More specifically, the detector 210 comprises a Honeywell HMC1052 2-axis magnetometer, which measures magnetic field strength in 2 axes. Tests have indicated that the preferred 2 axes to sense are the z-axis (vertical axis, generally perpendicular to the roadway or earth's surface) and the horizontal axis (generally parallel to the roadway or earth's surface). To reduce interference from overhead power lines (particularly tram overhead power lines), the axis being sensed must be parallel to the power lines in question. Persons skilled in the relevant art would readily understand that other magnetometers and/or sensing devices may be practised in place of, or in addition to, the 2-axis HMC1052 device.

Other sensing devices that may be practised include, but are not limited to, ultrasonic range finding devices, pulse induction metal detection devices and RF reflected signal mixing devices. Other magnetometers may also be practised, such as the single axis Honeywell HMC1051 device. Multiple detection devices may also be practised in combination to provide increased confidence in relation to vehicle presence detection.

The processor 220 comprises a Texas Instruments MSP430 16-bit microcontroller with an on-board real-time clock and on-board flash memory for storing data and the software program executed by the microcontroller. Operational data, such as data relating to vehicle presence, is also stored in a separate serial flash memory. Persons skilled in the relevant art would readily understand that numerous other microprocessors or microcontrollers may be practised in place of the Texas Instruments MSP430. Furthermore, other peripheral combinations may also be practised such as an off-board real-time clock and other types of memory (e.g., random access memory (RAM), read only memory (ROM), and other memory types that are known in the art).

The radio receiver 240 and radio transmitter 250 are practised as a 433 MHz ultra-high frequency (UHF) radio transceiver for transmitting and receiving radio signals to and from a data collection apparatus, respectively. Various UHF transceivers may be practised such as the Micrel MICRF501 transceiver, which requires to be turned on for approximately 1 ms before RF carrier energy can be detected. However, persons skilled in the art would readily understand that other types of transmitters, receivers or transceivers may be practised such as low frequency (LF) transceivers. Other UHF frequencies may also be practised such as in frequency bands commonly used for low powered devices, including 868 MHz, 915 MHz and 2.4 GHz.

The battery 260 comprises a lithium manganese dioxide ($LiMnO_2$) battery, which may be capable of providing the apparatus 200 with 5 to 10 years of continuous operation. Again, persons skilled in the art would readily understand that various other battery types may be practised in place of a $LiMnO_2$ battery.

The apparatus 200 generally operates in a low-power mode while detecting vehicle movements and presence in a corresponding parking space, which may be practised on a continuous or periodic (e.g., interrupt driven) basis to conserve battery life. Although the radio receiver 240 of the apparatus 200 consumes a small amount of power (relative to other radio receivers), the radio receiver 240 is only turned on for the shortest possible time duration at regular intervals to detect the presence of a data collection apparatus. At other times, the radio receiver 240 is turned off to conserve battery life.

In certain embodiments, the apparatus 200 is of cylindrical shape having a diameter of approximately 33 mm and a length of approximately 65 mm for permanent burial in a road or parking space surface as an in-ground unit (IGU). IGUs are installed into a 35 mm vertical hole drilled into the road or parking space surface, typically in the centre of the parking space that is to be monitored. The hole is preferably drilled to a depth that enables the top of an IGU to be located approximately 30 mm below the surface of the road or parking space. The IGU is then covered by filling the hole with an appropriate material that matches the existing surface. Once installed, it is not intended that an IGU be removed.

In other embodiments, the apparatus 200 is practised in a low-profile, high strength plastic (e.g., PVC), domed housing that permits fixing to a road or parking space surface without the need for drilling. Fixing may be achieved by any suitable method such as an adhesive similar to that used to fix "cateye" reflectors to a road surface. In such instances, however, the monitoring apparatus 200 does not remain concealed under the surface and may thus be subject to vandalism.

The apparatus 200 records vehicle movement events into and out of an associated parking space. The park duration of a vehicle in an associated parking space may also be stored. Event information is stored in non-volatile memory together with a time stamp to enable overstay situations to be detected.

In one embodiment, the apparatus 200 determines and maintains three primary types of information:

Current Status

The current status of the parking space in terms of vehicle presence (i.e., present or not present) and the amount of time the space has remained in the present state.

Historical Vehicle Movements

A record of each vehicle movement in the parking space including the date and time of the movement.

Overstay Situation

Detected when a vehicle remains in said parking space for a duration longer than a defined time interval.

The apparatus 200 may optionally be programmed with information relating to the hours of operation and parking time limits that apply to an associated parking space based on the time of day and day of week. Decisions concerning overstay can thus be made by the apparatus 200 based on different time limits that may apply to the parking space at different times.

Information may also be downloaded to the apparatus 200 using a radio receiver in the apparatus 200. The same radio receiver as used for receiving wake-up signals or a separate radio receiver may be used for this purpose. The downloaded information may comprise, but is not limited to:

application firmware for the apparatus 200, a table of operating hours and time limits (time of day and day of week) applicable to an associated parking space, operating parameters for the apparatus 200, and information for updating or synchronising the real-time clock with a more accurate real-time source.

Alternatively, decisions relating to vehicle overstay can be made by a data collection apparatus that collects data from the apparatus 200 via a radio communication link rather than by the apparatus 200.

The detection or monitoring apparatuses may also communicate directly with one another via the UHF or LF transceivers described hereinbefore. Such communication enables reduction or even elimination of cross-talk between parking spaces in close proximity to one another, particularly adjacent parking spaces. Vehicle presence may also be detected with a greater degree of confidence when inter-detection apparatus communication occurs.

Figure 3:
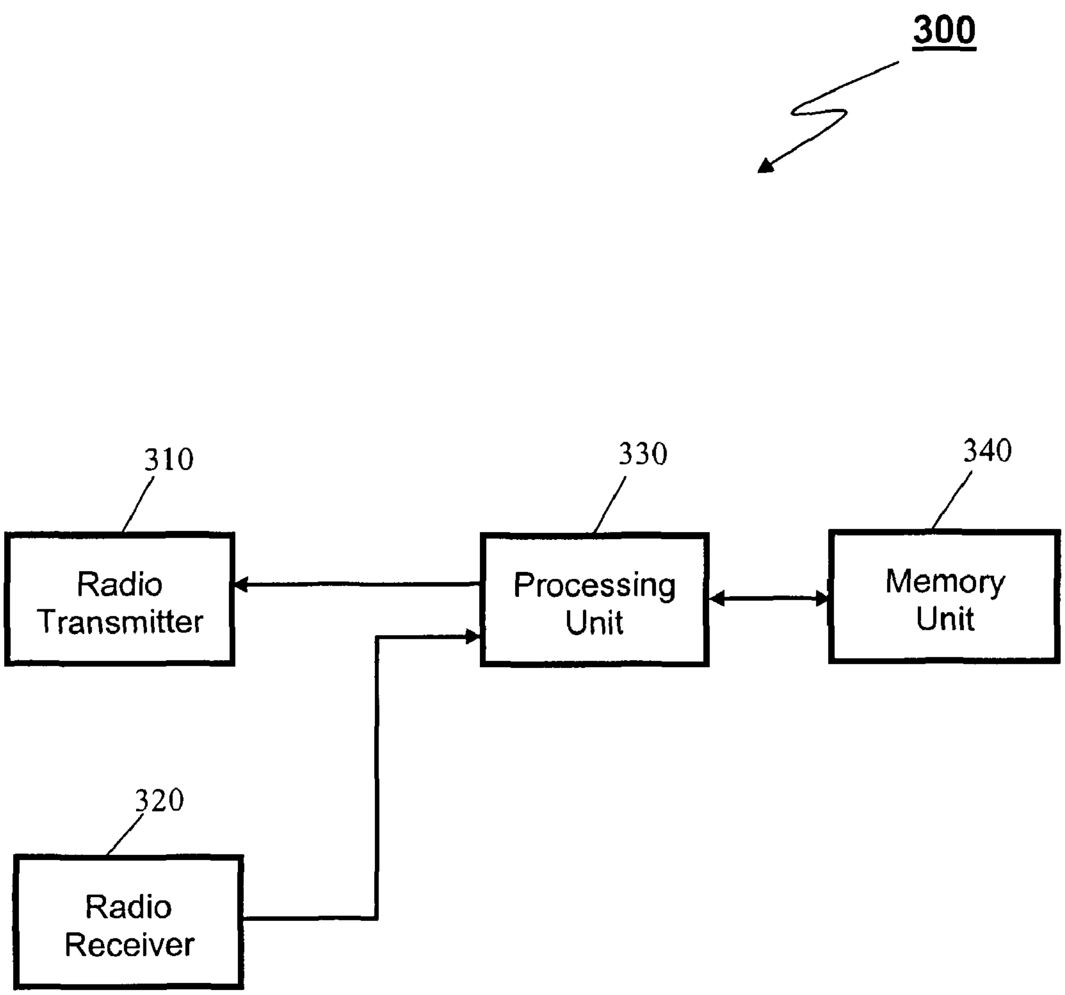
FIG. 3 is a block diagram of a data collection apparatus for retrieving data from one or more detection apparatuses.

FIG. 3 is a block diagram of a data collection apparatus 300 for collecting data from one or more vehicle monitoring apparatuses such as the apparatus 200 shown in FIG. 2.

The data collection apparatus 300 comprises a processing unit 320 coupled to a radio transmitter 310, a radio receiver 320, and a memory unit 340.

A transceiver for performing bi-directional communications with one or more detection apparatuses may be practised in place of the separate transmitter 310 and receiver 320. In certain embodiments, the transceiver 412 operates in the ultra-high frequency (UHF) band at 433 MHz. However, other frequency bands such as the low frequency (LF) band may be practised in place of, or in addition to, UHF as would be appreciated by those skilled in the art. For example, the LF band may be used to transmit a "wake-up" or activation signal to vehicle monitoring apparatuses.

Figure 4:
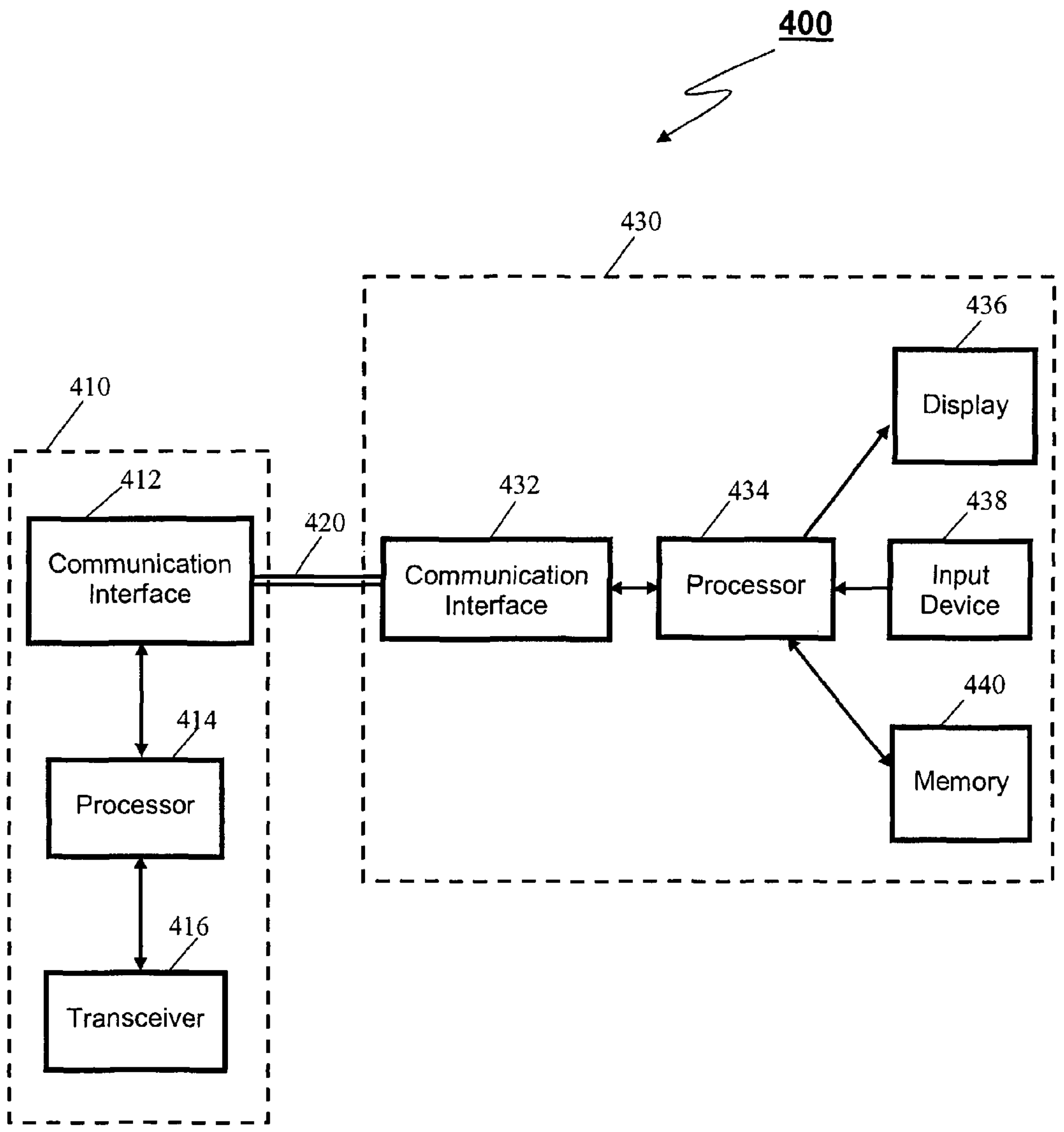
FIG. 4 is block diagram of another data collection apparatus for retrieving data from one or more detection apparatuses.

FIG. 4 is block diagram of another data collection apparatus 400 for collecting data from one or more vehicle monitoring apparatuses such as the detection apparatus 200 shown in FIG. 2.

The data collection apparatus 400 comprises an interface unit 410 coupled to a computer unit 430 by means of a Bluetooth wireless communications link 420. However, other wireless and wired communications links may be practised, such as a serial communications link (e.g., RS-232), as would be well known to those skilled in the art.

The interface unit 410 comprises a communications interface 412 for communicating with the computer unit 430, a processor 414 for processing data, and a transceiver 416 for communicating with one or more vehicle monitoring apparatuses, including waking-up the one or more vehicle monitoring apparatuses. In certain embodiments, the transceiver 416 operates in the ultra-high frequency (UHF) band at 433 MHz. However, other frequency bands such as the low frequency (LF) band may be practised in place of, or in addition to, UHF as would be appreciated by those skilled in the art. For example, the LF band may be used to transmit a "wake-up" or activation signal to vehicle monitoring apparatuses.

The computer unit 430 comprises a communications interface 432 for communicating with the interface unit 410, a processor 434 for processing data, a display 436 such as a liquid crystal display (LCD) screen for displaying data, an input device 438 such as a keyboard for inputting data, and a memory 438 for storing data. The computer unit 430 may comprise a proprietary computer platform or an off-the-shelf portable computer such as a personal digital assistant (PDA). In one embodiment, a Symbol PPT8800 ruggedised personal computer is practised as the computer unit 430.

The data collection apparatuses 300 and 400 typically provide the following functionality:

Wake up all the monitoring units within an immediate vicinity or wake up individual monitoring units on a selectively addressable basis, Enquire if a vehicle presently parked has overstayed an allowed time limit, Enquire as to the current status of the parking space, and Collect historical vehicle movement data.

A data collection apparatus may be enabled to collect all or only a limited subset of the information available from a monitoring apparatus.

Either of the data collection apparatuses 300 and 400 may be implemented as a portable hand-held apparatus for operation by pedestrian parking enforcement officers or as a vehicle-mounted apparatus for use by parking enforcement officers operating in a moving vehicle. Thus, parking violations may be identified as enforcement officers walk or drive in the vicinity of monitored parking spaces. When the data collection apparatus shown in FIG. 4 is used by a pedestrian enforcement officer, the interface unit 410 may be mounted on the officer's belt while the computer unit 430 is operated in a hand-held manner. When implemented as a hand-held version, the data collection apparatuses 300 and 400 are powered by a battery-based power source, which may be rechargeable. The vehicle-based data collection apparatus is capable of transmitting and receiving data to and from multiple monitoring units while traveling at up to 60 km per hour.

A data collection apparatus transmits a wake-up signal (e.g., RF carrier followed by a defined message) and listens for valid responses from detection apparatuses. If no response is received from a detection apparatus, the data collection apparatus repeatedly transmits the wake-up signal.

In addition to direct communication between detection apparatuses and vehicle-mounted or hand-held data collection apparatuses, a system may be configured such that the detection apparatuses communicate with a data collection apparatus via local area concentrators or repeaters. A concentrator or repeater may be configured to relay information from the detection apparatuses to a fixed central data collection point or to vehicle-mounted or hand-held data collection apparatuses. Information may thus be selectively relayed to data collection apparatuses that are best able to use the information. For example, greater efficiency in overstay enforcement may be obtained by enabling enforcement officers to travel down a major road while collecting information about parking spaces located in nearby cross streets. Such a system configuration may also be efficient for use in large area off-street parking lots or parking stations.

Figure 5:
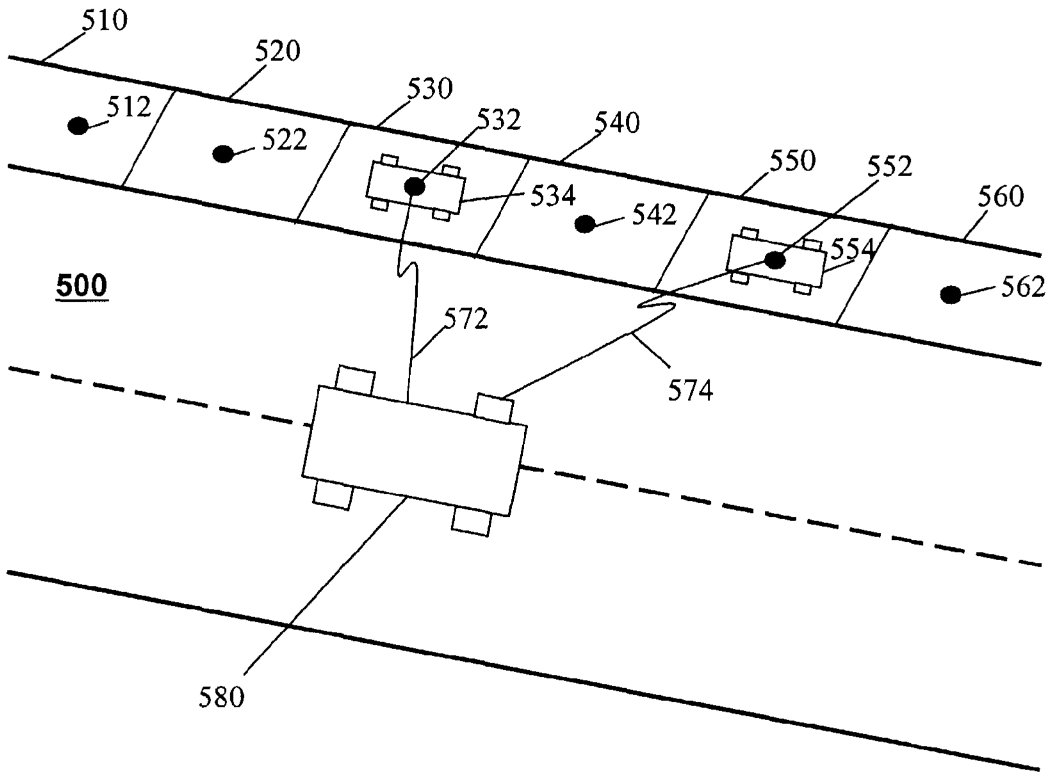
FIG. 5 is a schematic diagram of a system for identifying overstay of vehicles in parking spaces.

FIG. 5 is a schematic diagram of a system for identifying overstay of vehicles in parking spaces. FIG. 5 shows detection apparatuses 512, 522, . . . , 562 installed in parking spaces 510, 520, . . . , 560, respectively. Vehicles 534 and 554 are parked in parking spaces 530 and 550, respectively. Detection apparatuses 532 and 552 are shown in radio communication with a data collection device in a vehicle 580 travelling along a road 500 by means of jagged lines 572 and 574, respectively.

Figure 6:
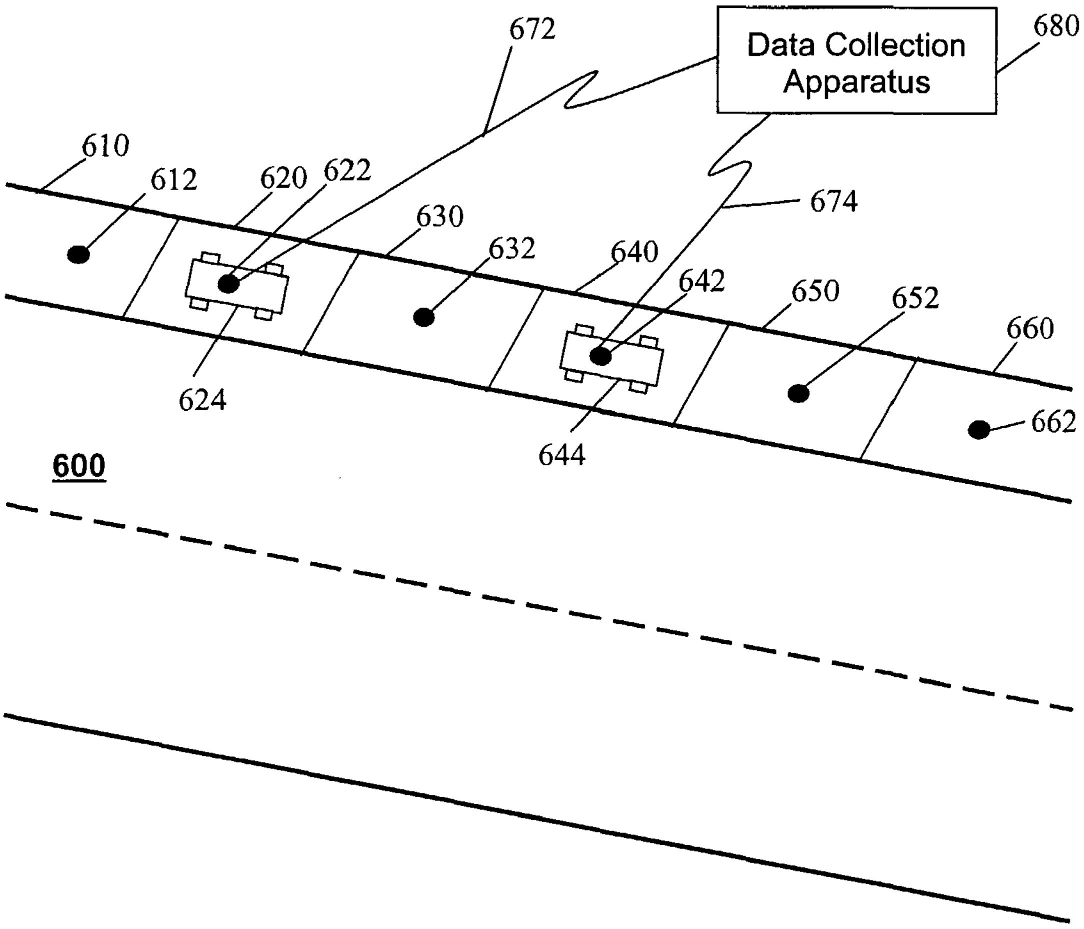
FIG. 6 is a schematic diagram of another system for identifying overstay of vehicles in parking spaces.

FIG. 6 is a schematic diagram of another system for identifying overstay of vehicles in parking spaces. FIG. 6 shows detection apparatuses 612, 622, . . . , 662 installed in parking spaces 610, 620, . . . , 660, respectively. Vehicles 624 and 644 are parked in parking spaces 620 and 640, respectively. Detection apparatuses 622 and 642 are shown in radio communication with a data collection device 680 by means of jagged lines 672 and 674, respectively. The data collection device 680 may be of fixed location remote from the parking spaces 610, 620, . . . , 660 or may comprise a hand-held portable apparatus carried by a pedestrian enforcement officer.

Figure 7:
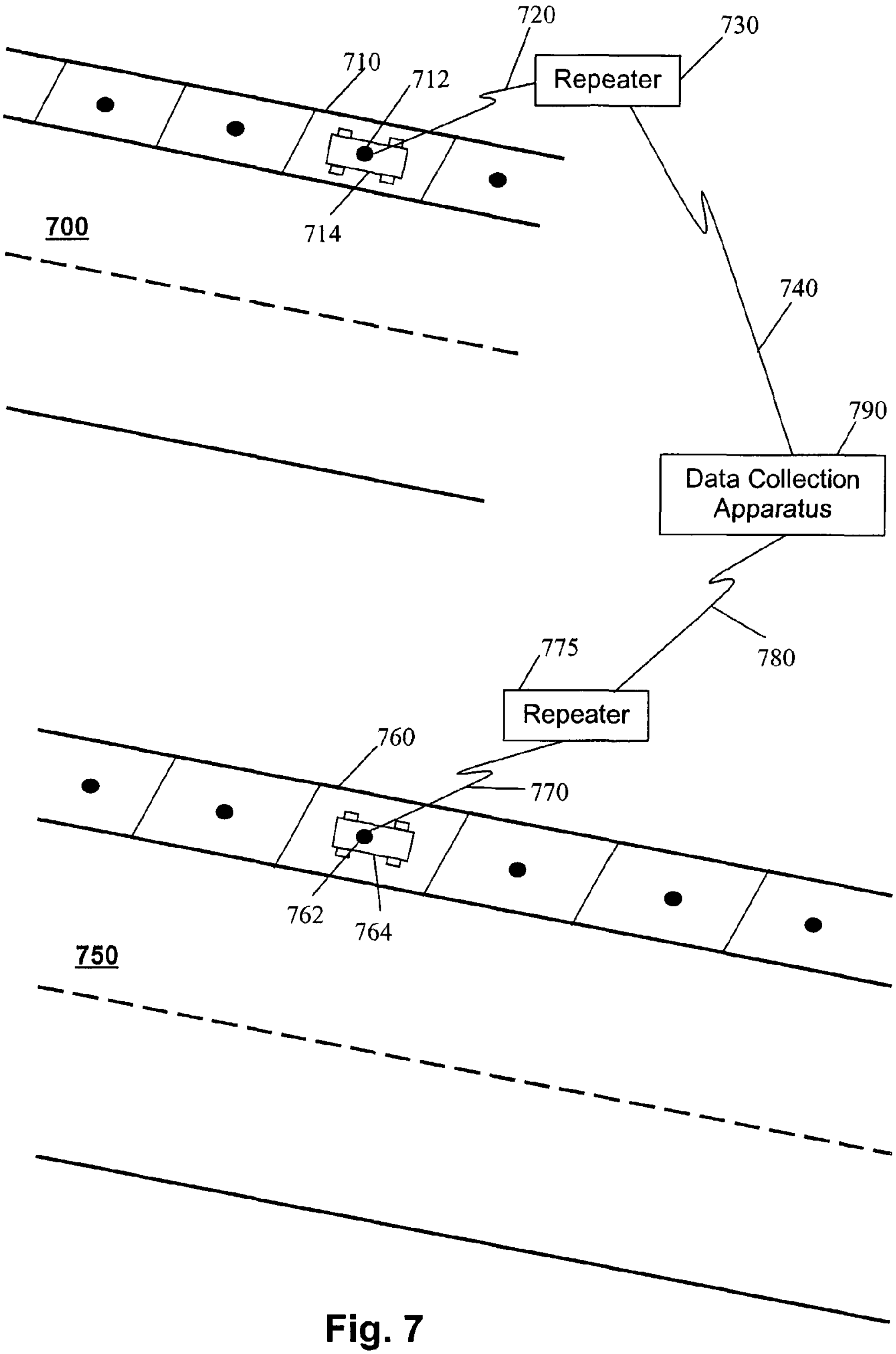
FIG. 7 is a schematic diagram of a further system for identifying overstay of vehicles in parking spaces.

FIG. 7 is a schematic diagram of another system for identifying overstay of vehicles in parking spaces. FIG. 7 shows detection apparatuses 712 and 762 installed in parking spaces 710 and 760, respectively. Parking spaces 710 and 760 are located in different roads 700 and 750, respectively. Vehicles 714 and 764 are parked in parking spaces 710 and 760, respectively. Detection apparatuses 712 and 762 are shown in radio communication with repeaters 730 and 770, respectively, by way of jagged lines 720 and 770, respectively. The repeaters 730 and 775 are shown in communication with a central data collection apparatus 790 by way of jagged lines 740 and 780, respectively. Communication between the repeaters 730 and 775 and the data collection apparatus 790 may be via radio, telephone (POTS), data or communication network, or any other known communication means.

Historical vehicle movement and/or presence data collected from detection apparatuses may optionally be transferred to a back office system for use by traffic engineers who require information about parking space utilisation (i.e., vehicle length of stay and parking space availability). The back office system comprises a parking space configuration database, a parking space activity database and an enforcement activity database. The system assists in identifying parking spaces of likely future overstay within a patrol area and evaluating the success of a parking time limit enforcement system. Monitoring of parking spaces may be increased or decreased based on the level of compliance determined using the back office system.

The system may optionally further comprise a digital video recording sub-system to provide visual evidence of actual presence of vehicles in parking spaces.

Figure 8:
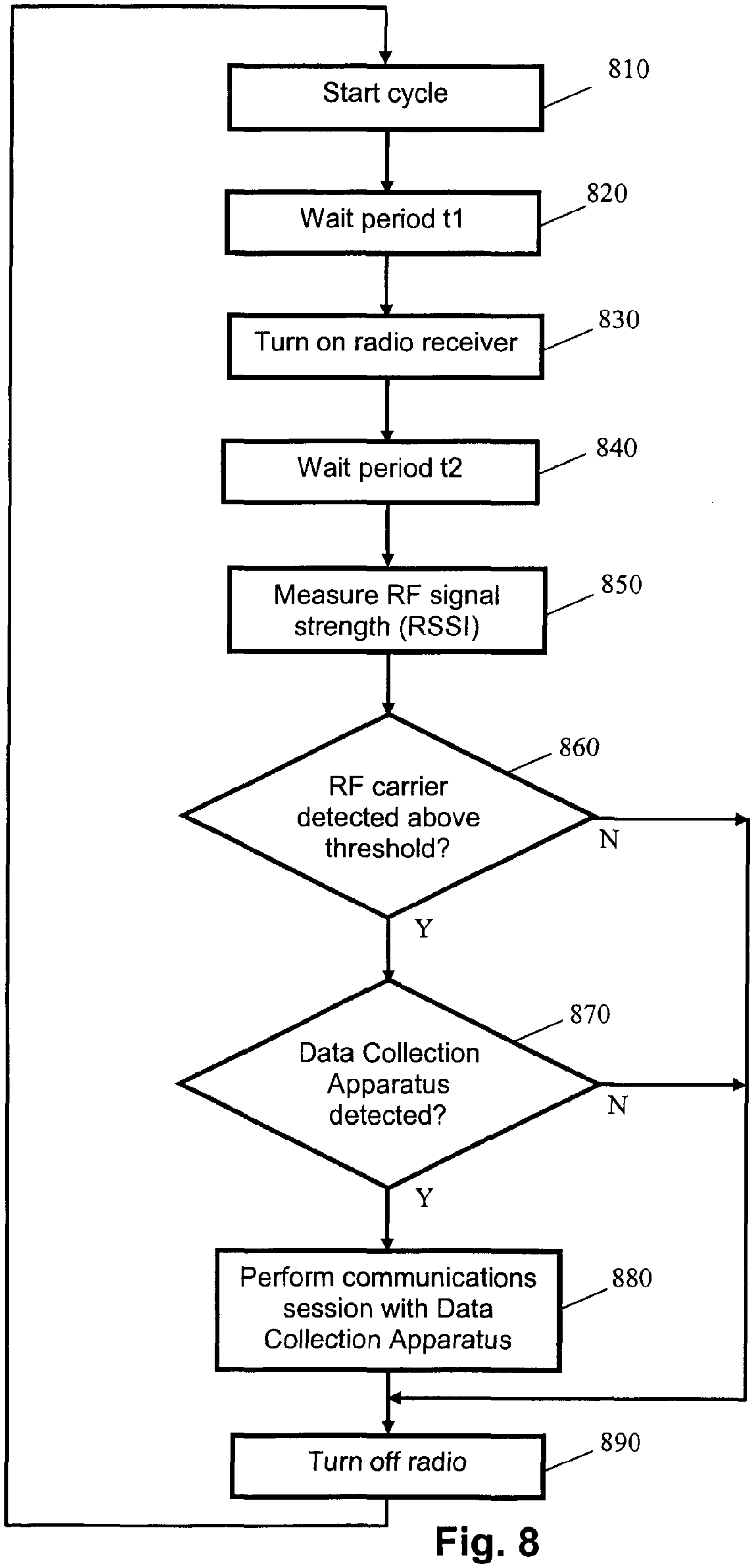
FIG. 8 is a flow diagram of a method of operating a detection apparatus according to an embodiment of the present invention.

FIG. 8 is a flow diagram of a method of operating a detection apparatus such the apparatus 200 in FIG. 2. A cycle of operation begins at step 810. After a wait period of duration t1 at step 820, the radio receiver is turned on at step 830. After a further wait period of duration t2 at step 840, for the radio receiver to stabilise, the received radio frequency signal strength (RSSI) is measured at step 850. At step 860, a determination is made whether the signal strength of a detected RF carrier is larger than a defined threshold. If an RF carrier of sufficient signal strength is detected (Y), a determination is made at step 870 whether the RF carrier relates to a data collection apparatus. If a data collection apparatus is detected (Y), a communications session between the detector apparatus and the data collection apparatus occurs at step 880. Such a session typically involves transmission and reception by both the detector apparatus and the data collection apparatus. The radio receiver and transmitter are turned off at step 890 and a new operation cycle begins at step 810.

If an RF carrier of sufficient signal strength is not detected (N), at step 860, the radio receiver is turned off at step 890 and a new operation cycle begins at step 810.

If a data collection apparatus is not detected (N), at step 870, the radio receiver is turned off at step 890 and a new operation cycle begins at step 810.

The duration t2 is determined according to the type of radio receiver used and is typically of the order of 1 millisecond. Setting the duration t1 to 250 milliseconds implies an on:off duty cycle of 1:250. A typical low-power radio receiver may consume 5 to 10 mA in receiver mode and the average power consumption of the data collection apparatus detection process is thus 20 to 40 μA.

Figure 9:
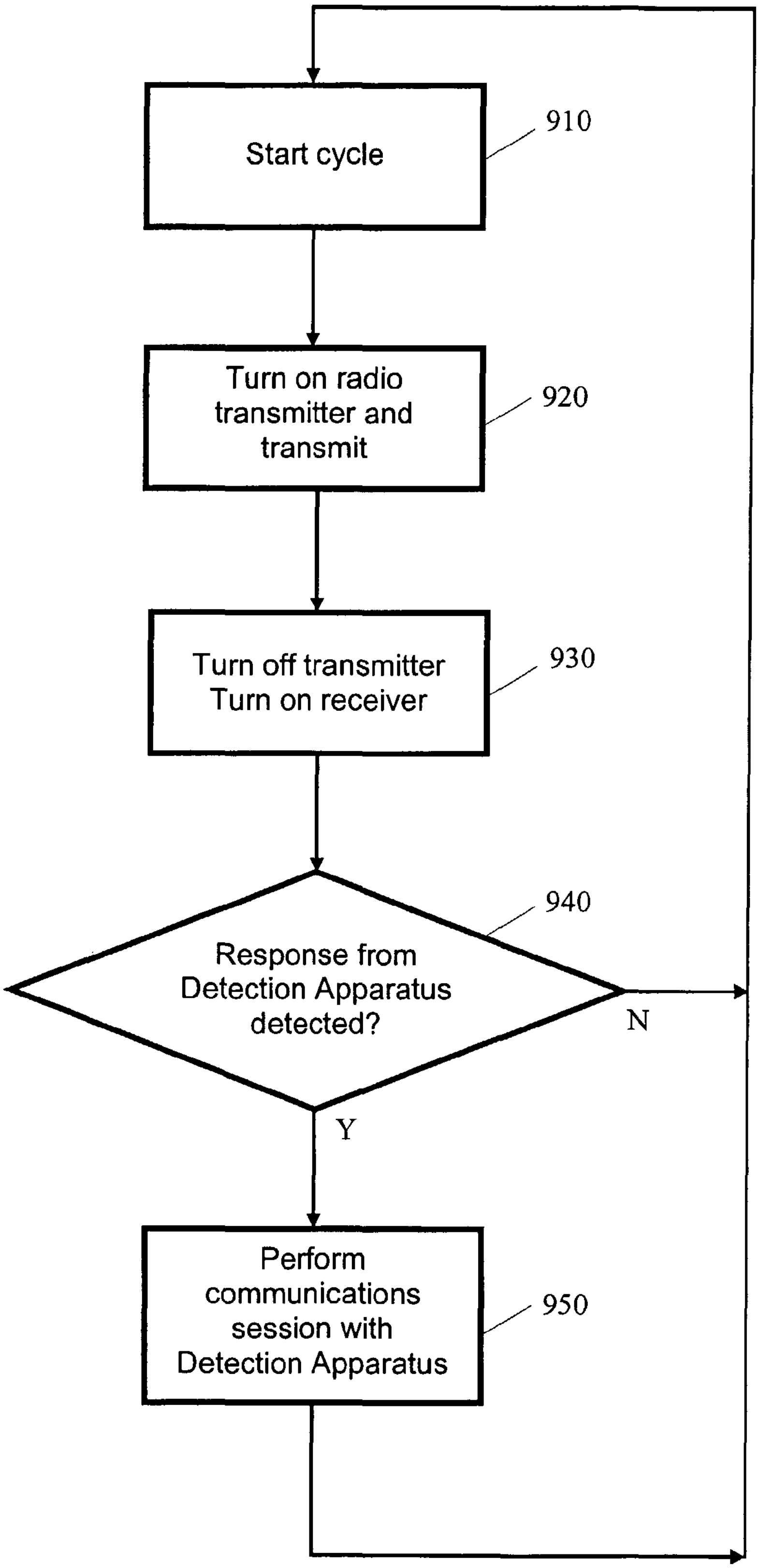
FIG. 9 is a flow diagram of a method of operating a collection apparatus according to an embodiment of the present invention.

FIG. 9 is a flow diagram of a method of operating a data collection apparatus such as the data collection apparatus 300 in FIG. 3 or the data collection apparatus 400 in FIG. 4. A cycle of operation begins at step 910. At step 920, the radio transmitter of the data collection apparatus is turned on and a radio frequency carrier is continuously transmitted for a time duration t3 followed by a command message. At step 930, the radio transmitter is turned off and the radio receiver is turned on. A determination is made at step 940 whether a response from a data apparatus is detected. If a response from a detection apparatus is detected (Y), a communications session between the detector apparatus and the data collection apparatus occurs at step 950. Such a session typically involves transmission and reception by both the detector apparatus and the data collection apparatus. After termination of the communication session, a new operation cycle begins at step 910.

The duration t3 for continuous transmission of radio frequency carrier by the data collection apparatus must be greater than the duration t1 in the detection apparatus (see step 820 in FIG. 8) to ensure wake-up of a detection apparatus. A typical duration for t3 is:

$$\begin{aligned} t3 &= t1 + 5\text{ms} \\ &= 250 + 5 \\ &= 255\text{ms}. \end{aligned}$$

The length of a typical parking bay is 6.5 m. Assuming a vehicle in which a data collection apparatus is located travels at 60 km/h, the time in which the data collection apparatus travels 6.5 m is 390 ms. Given that 255 ms of this time is used to transmit radio frequency carrier, the remainder of 390 ms−255 ms=135 ms is available for data communications between a detection apparatus and a data collection apparatus. At a data rate of 9,600 bits per second, approximately 1,200 bits of data can be transferred.

As described hereinbefore in relation to the embodiment shown in FIG. 2, the detection or monitoring apparatuses may communicate directly with one another. Inter-parking space or inter-detection apparatus communication enables improved differentiation between ambient or unwanted magnetic variations and magnetic variations due to the presence or movement of a vehicle in a particular parking space. Examples of unwanted magnetic variations include magnetic variations resulting from movement of vehicles in a roadway adjacent or near to a particular parking space being monitored, electrical currents in nearby power cables and movement of a vehicle in an adjacent parking space. Short- and long-term magnetic variations due to movement of a vehicle in a particular parking space being monitored may be thought of as "signal", whereas unwanted magnetic variations may be thought of as "noise". Increasing the signal-to-noise ratio enables more reliable detection of real presence and movement of vehicles in a parking space being monitored.

In certain cases, unwanted magnetic variations will be detected by detection or monitoring apparatuses in multiple parking spaces. Using inter-detection apparatus communications, a particular detection or monitoring apparatus can compare its own measured values of magnetic field with those of detection or monitoring apparatuses in adjacent or nearby parking spaces and, as a result, neglect or cancel unwanted or ambient magnetic variations.

A further advantage of inter-detection apparatus communications is that messages such as a parking overstay alert may be forwarded from parking space to parking space, for example, to a transmitter, repeater or data collection apparatus at the end of a street.

Methods, apparatuses and systems for identifying overstay of vehicles in parking spaces have been described herein. Embodiments described include detection or monitoring apparatuses that can be woken-up repeatedly, but at irregular time intervals, depending on when a data collection apparatus is present. This advantageously avoids the need for a persistent wide area network. The use of a portable data collection apparatus further enables parking overstay information to be directly available to enforcement officers in the field. This advantageously overcomes the difficulty of relaying such information back to a central location and subsequently dispatching or alerting enforcement officers accordingly.

The embodiments described may be practised independently of or in conjunction with various parking payment systems such as single or multi-bay parking meters and pay and display systems. The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

The invention claimed is:

1. A method for identifying overstay of a vehicle in a parking space, said method comprising the steps of:

detecting presence of a vehicle in said parking space using a battery-powered apparatus encased in a self-contained, sealed housing;

processing and storing, in said battery-powered apparatus encased in a self-contained, sealed housing, data relating to presence of said vehicle in said parking space;

determining from said stored data, by said battery-powered apparatus encased in a self-contained, sealed housing and independently of any parking payment system, whether said vehicle has overstayed a defined time duration in said parking space; and wirelessly transmitting, from said battery-powered apparatus encased in a self-contained, sealed housing, data relating to an identified instance of overstay of said vehicle in said parking space.

2. The method of claim 1, wherein said step of wirelessly transmitting is performed in response to receipt of a wireless wake-up signal by said battery-powered apparatus encased in a self-contained, sealed housing.

3. The method of claim 2, wherein wireless wake-up signals are received irregularly with respect to time by said battery-powered apparatus encased in a self-contained, sealed housing.

4. The method of claim 2, wherein said wireless wake-up signal is received by said battery-powered apparatus encased in a self-contained, sealed housing from a portable data collection apparatus.

5. The method of claim 2, wherein said wireless wake-up signal is received by said battery-powered apparatus encased in a self-contained, sealed housing from a portable data collection apparatus located in a moving vehicle.

6. The method of claim 1, wherein said step of detecting presence of a vehicle in said parking space comprises measurement of changes in the earth's magnetic field resulting from presence of a vehicle in said parking space.

7. The method of claim 1, wherein said step of processing and storing data relating to presence of the vehicle comprises one or more of the steps from the group of steps consisting of:

determining presence duration of the vehicle in said parking space and storing a record thereof; and determining vehicle movements in and out of said parking space and storing time-stamped records thereof.

8. The method of claim 1, comprising the further step by said battery-powered apparatus encased in a self-contained, sealed housing and independently of any parking payment system of determining an overstay duration of the vehicle in said parking space and storing a record thereof.

9. The method of claim 1, comprising the further step of wirelessly communicating with another battery-powered apparatus encased in a self-contained, sealed housing for detecting vehicle overstay in another parking space.

10. The method of claim 1, comprising the further step by said battery-powered apparatus encased in a self-contained, sealed housing and independently of any parking payment system of selecting said defined time duration from a plurality of stored time durations based on the current time.

11. An apparatus for identifying overstay of a vehicle in a parking space, said apparatus comprising:

a detector adapted to detect presence of a vehicle in the parking space;

a processor coupled to said detector, said processor adapted to process and store data received from said detector and to determine from said data and independently of any parking payment system whether said vehicle has overstayed a defined time duration in said parking space;

a radio receiver coupled to said processor for receiving wake-up signals;

a radio transmitter coupled to said processor for transmitting data relating to identified instances of overstay of said vehicle in said parking space; and a battery for providing power to said detector, processor, radio receiver, and radio transmitter;

wherein said apparatus is encased in a self-contained, sealed housing.

12. The apparatus of claim 11, wherein said radio transmitter is adapted to wirelessly transmit said data in response to receipt of a wake-up signal from a data collection apparatus located remotely from said parking space.

13. The apparatus of claim 12, wherein wireless wake-up signals are received at irregular intervals in time.

14. The apparatus of claim 11, further comprising a real-time clock coupled to said processor.

15. The apparatus of claim 14, wherein said processor is adapted to select said defined time duration from a plurality of stored time durations on the basis of data received from said real-time clock.

16. The apparatus of claim 15, further comprising a radio receiver for receiving parking time duration data associated with said parking space.

17. The apparatus of claim 14, wherein said transmitted data comprises one or more data items selected from the group of data items consisting of:

presence duration of the vehicle in said parking space;

time-stamped movements of the vehicle into and out of said parking space; and overstay of the vehicle in said parking space.

18. The apparatus of claim 11, wherein said detector comprises one or more detection devices selected from the group of detection devices consisting of:

a magnetometer device for detecting changes in the earth's magnetic field;

a pulse induction device for metal detection; and an ultrasonic device for measuring distance.

19. The apparatus of claim 11, wherein said detector comprises a magnetometer that measures magnetic field variations in an axis parallel to the earth's surface.

20. The apparatus of claim 11, wherein said radio receiver and said radio transmitter are further adapted for communication with another such battery-powered apparatus.

21. A system for identifying overstay of vehicles in parking spaces, said system comprising:

a plurality of battery-powered detection apparatuses each encased in a self-contained sealed housing for identifying overstay of vehicles in respective parking spaces independently of a parking payment system; and a data collection apparatus for wirelessly retrieving data from said plurality of battery-powered detection apparatuses, said data collection apparatus comprising:

a radio transmitter for transmitting wake-up signals to ones of said plurality of battery-powered detection apparatuses;

a radio receiver for receiving data from woken-up ones of said plurality of battery-powered detection apparatuses;

a memory unit for storing data and instructions to be performed by a processing unit; and a processing unit coupled to said radio transmitter, said radio receiver and said memory unit;

said processing unit programmed to process said data received via said radio receiver and to indicate incidences of vehicle overstay to an operator;

wherein said data relates to identified instances of vehicle overstay in a respective parking space.

22. The system of claim 21, wherein said data is received from one of said battery-powered detection apparatuses in response to receipt of a wake-up signal transmitted from said date collection apparatus.

23. The system of claim 22, wherein said data collection apparatus is portable.

24. The system of claim 22, wherein said plurality of battery-powered detection apparatuses each comprise:

a detector adapted to detect presence of a vehicle in the parking space;

a processor coupled to said detector, said processor adapted to process and store data received from said detector and to determine from said data and independently of any parking payment system whether said vehicle has overstayed a defined time duration in said parking space;

a radio receiver coupled to said processor for receiving wake-up signals;

a radio transmitter coupled to said processor for transmitting data relating to identified instances of overstay of said vehicle in said parking space; and a battery for providing power to said detector, processor, radio receiver, and radio transmitter;

wherein said apparatus is encased in a self-contained, sealed housing.

25. The system of claim 22, further comprising at least one radio repeater for repeating radio signals between said detection apparatuses and said data collection apparatus.

26. The system of claim 22, wherein said data collection apparatus comprises a radio transmitter for transmitting parking time duration data associated with a parking space to one or more of said plurality of detection battery-powered apparatuses.

27. The system of claim 22, wherein said plurality of battery-powered detection apparatuses comprise a transmitter and receiver for communicating with other ones of said plurality of battery-powered detection apparatuses.

* * * * *